United States Patent

[11] 3,607,043

[72] Inventors Carl Vance McDaniel
Laurel;
Richard William Baker, Ellicott City; Clark Ace Rundell, Wheaton, all of Md.
[21] Appl. No. 878,249
[22] Filed Nov. 19, 1969
[45] Patented Sept. 21, 1971
[73] Assignee W. R. Grace & Co.
New York, N.Y.
Continuation-in-part of application Ser. No. 796,215, Feb. 3, 1969.

[54] CATION AND THERMAL STABILIZATION OF A FAUJASITE-TYPE ZEOLITE
8 Claims, No Drawings
[52] U.S. Cl.................................. 23/111,
208/120, 252/455
[51] Int. Cl..................................... C01b 33/28
[50] Field of Search.................................23/111–113;
252/455 Z; 208/120

[56] References Cited
UNITED STATES PATENTS
3,293,192 12/1966 Maher et al.................. 23/111 X
3,393,147 7/1968 Dwyer et al................... 208/120
3,402,996 8/1968 Maher et al.................... 23/112
3,449,070 6/1969 McDaniel et al.............. 23/111
3,455,842 7/1969 Cornelius et al.............. 252/455
3,508,867 4/1970 Frilette et al.................. 23/111
3,537,816 11/1970 Moscou et al................. 23/112

*Primary Examiner*—Edward J. Meros
*Attorneys*—Joesph P. Nigon and Kenneth E. Prince ABSTRACT: A process for preparing a faujasite-type zeolite having a silica to alumina ratio of at least 3.2 by treating the faujasite with a combination of ammonium ion exchange and metal cation exchange, including rare earths, to reduce the $Na_2O$ level in the product to below 3 percent followed by thermal stabilization. The final step in the process is replacement of at least part of the cations with aluminum ions by exchange with an aluminum salt solution. The resulting zeolite is characterized by high surface area, exceptional catalytic activity and a favorable catalytic selectivity. The zeolite has exceptionally high activity and selectivity when used as a component in a hydrocarbon-cracking catalyst.

CATION AND THERMAL STABILIZATION OF A FAUJASITE-TYPE ZEOLITE

This application is a continuation-in-part of U.S. Pat. application Ser. No. 796,215, filed Feb. 3, 1969. The present invention relates to crystalline aluminosilicates, commonly referred to as molecular sieves. More specifically this invention relates to the preparation of a faujasite-type material having a silica to alumina ratio of 3.2 to 7 characterized by high thermal stability and exceptional catalytic activity wherein a large portion of the sodium content of the zeolite is replaced by aluminum.

In the past, several attempts have been made to prepare aluminum-exchange faujasite. In general, these attempts have resulted in failure or in ambiguous results due to the fact that aluminum salts are quite acidic and attempts to exchange aluminum into the faujasite structure resulted in loss of crystallinity.

Faujasite is a naturally occuring aluminosilicate having a characteristic X-ray structure. The synthetic materials designated zeolite X and zeolite Y by the Linde Division of Union Carbide Corporation are common examples of synthetic faujasites. This application is concerned with the faujasite designated zeolite Y. In U.S. Pat. No. 3,130,007, the chemical formula is given as follows:

$$0.9 \pm 0.2 Na_2O : Al_2O_3 : wSiO_2 : xH_2O$$

where *w has a value of greater than* 3 and up to about 6 and $x$ may have a value as high as 9.

In our novel process, we use the high-silica faujasite as a starting material. The faujasite is converted to our novel product by a combination of ammonium salt exchanges, metal cation exchanges (which can include rare earths), aluminum salt exchanges, and intermediate thermal treatment of the product. In the preferred process, the thermally treated product is exchanged with an aluminum salt solution to convert it to the aluminum exchanged faujasite.

There are several prior art processes for preparing the high silica faujasite-type zeolites that are used as the starting material in the preparation of our novel zeolite.. The sodium form of faujasite is prepared from a mixture is varied depending on the product composition desired. Employing an aqueous colloidal silica sol or a reactive amorphous silica, it is reported that the high-silica form of faujasite can be obtained from a reaction mixture having a composition with the following range:

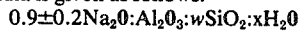

| | |
|---|---|
| $Na_2O/SiO_2$ | 0.4 to 6 |
| $SiO_2/Al_2O_3$ | 15 to 25 |
| $H_2O/Na_2O$ | 20 to 50 |

We have found a high-silica faujastie having good thermal stability and exceptionally high catalytic activity and selectivity when used as a component of a petroleum-cracking catalyst can be prepared in a process which reduces the $Na_2O$ content of the high-silica synthetic faujasite to about 3 percent by ammonium exchange, followed by exchange with a rare earth salt solution to a rare earth cation level of about 0.3 to 10 percent by weight followed by washing and thermally treating at a temperature of 70° to 1,600° F. The product is then exchanged with a salt solution containing an aluminum salt solution such as aluminum chloride solution, for example, to remove the balance of the sodium and introduce aluminum into the structure. The product is then washed and dried. The product has the empirical formula: $(0.1$ to $0.7$ $Al_{2/3}O + $ to $0.6$ $RE_{2/3}O)$ $: Al_2O_3 : -7$ $SiO_2 : 0-9$ $H_2O$.

The resulting novel product has the following properties:
a. Thermal stability to 1,700° F.,
b. An exchanged aluminum content of 0.5 to 5 percent by weight as $Al_2O_3$,
c. Surface area in excess of 800 square meters per gram,
d. Superior catalytic activity,
e. A silica to alumina ratio of 3.2 to 7, and
f. An $NA_2O$ content of less than 1 percent.

In the first step of our process, the synthetic faujasite material having a silica to alumina ratio between 3.3 and 7 and a characteristic X-ray diffraction pattern characteristic of faujasite is exchanged to replace most of the sodium ions by ammonium ions by base exchange with an ammonium salt. The exchange, if desired, may be carried out with a mixed solution containing an ammonium salt and other cation salts such as rare earth salts, for example. Examples of suitable ammonium compounds of this type include ammonium chloride, ammonium sulfate, tetraethyl ammonium chloride, tetraethyl ammonium sulfate, etc. Ammonium sulfate, because of its ready availability and low cost, is the preferred reagent in this step of the process. The exchange is carried out with an excess of the ammonium salt solution. The salt is present in excess of about 20 to 600 percent, preferably about 20 to 300 percent.

The exchange is carried out rapidly at 100° C. However, temperatures in the 25 to 150° C. range give satisfactory results. The exchange is essentially complete in a period of about 0.5 to 24 hours.

This preliminary exchange reduces the alkali metal content of the zeolite from about 13 percent to about 1.5 to 4 percent with a content of 2.0 to 3.0 percent being typical. After the exchange is completed, the zeolite is filtered and the cake returned to a solution of a salt containing a rare earth salt or other cation salt sufficient to provide about 0.5 to 15 percent of the ion expressed as the oxide per pound of zeolite. The exchange is carried out for a period of 30 to 120 minutes at a temperature of about 100° C.

The product is filtered and washed free of any excess salts. The cake is then calcined at a temperature of about 700 to 1,600° F. for a period of 0.1 to 3 hours.

The aluminum salt is added in the final exchange step of the process. The exchange can be carried out with an aluminum salt solution or a mixed aluminum-ammonium salt solution. In the preferred method of operation, the exchange is carried out with an ammonium salt solution to reduce the $Na_2O$ content of the product from the 3 percent level to less than 1 percent. This exchange is followed by an exchange to at least partially change the zeolite from the ammonium form to the aluminum form. The zeolite is then washed, dried, and the product recovered.

The high-silica synthetic faujasite is normally in the sodium form. However, it may be in any of the other alkali metal forms. By the term "alkali metal" we intend to include the elements of Group 1A, lithium through cesium. The term "rare earth elements" as used in this application, includes the elements from lanthanum to lutecium, atomic numbers 57 to 71. We also wish to include yttrium.

The novel product is characterized by thermal stability to a temperatures of 1,700° F. This characteristic is an important attribute if the zeolite is to be used as a component of a fluid-bed cracking catalyst since the regeneration temperature in the fluid bed frequently approaches 1,600° F. Our novel zeolite does not lose its crystal structure during thermal calcination at temperatures as high as 1,700° F. or stem treatment with 25 percent steam at temperatures of 1,525° F.

Another characteristic of our novel product is the surface area. The surface area of our product is in excess of 800 square meters per gram. The surface area is measured by the well-known Brunauer Emmett Teller (BET) method.

In addition, our novel product has an unusually high catalytic activity and selectivity. A catalyst prepared to contain 10 percent of the zeolite in a commercial semisynthetic silica-alumina-clay matrix converted more than 70 volume percent of a hdyrocarbon feed stock at a temperature of 900° F. and a weight hourly space velocity of 16.

Our zeolite has the X-ray diffraction pattern of faujasite. The X-ray diffraction pattern was determined using a Norelco X-ray diffractometer with a nickel filter copper K radiation. The instrument was operated at 40 kv. operating potential and 20 ma. The sample to be run was mixed with 10 percent of a suitable inert internal standard, such as sodium chloride and scanned from about 4.5° two-theta to about 60° two-theta at a goniometer speed of ½° per minute and a chart speed of ½ inch per minute.

The observed and theoretical (from National Bureau of Standards Circulars) values for the internal standard were used to correct systematic errors in the observed value of two-theta.

Our invention is further illustrated by the following specific but nonlimiting examples.

EXAMPLE 1

This example illustrates a satisfactory method of preparing the high-silica faujasite which is used as a raw material in preparing our novel product.

A solution was prepared to contain 90.6 grams of sodium hydroxide in 96.5 grams of water. A total of 52 grams of alumina trihydrate was dissolved in this solution. The solution was diluted with 195 grams of water. The solution was added to a paste made from 454 grams of water and 219 grams of fine-size silica having a particle size of 0.02 to 10 microns. The mixture was digested at 35° C. for five days and refluxed at 100° C. for two days. The product was filtered and washed. The product displayed the following X-ray diffraction lines:

TABLE A

| d (A.) | |
|---|---|
| 14.6±0.3 | 100 |
| 8.9±0.15 | 34 |
| 7.56±0.06 | 22 |
| 5.75±0.05 | 40 |
| 4.81±0.03 | 12 |
| 4.41 | 20 |
| 3.95 | 10 |
| 3.81 | 48 |
| 3.34±0.02 | 11 |
| 2.947±0.010 | 19 |
| 2.882 | 44 |
| 2.794 | 18 |
| 2.661±0.05 | 18 |

EXAMPLE 2

This example illustrates a method of preparing our novel product.

A total of 1,000 grams (dry basis) of a high-silica zeolite having a silica to alumina ratio of 6 was prepared according to the method described in Example 1. The zeolite was slurried with a solution containing 1,000 grams of ammonium sulfate in 10,000 grams of water. The slurry was heated to 100° C. for one hour with stirring, filtered, and the exchange repeated. The material was again filtered and the cake returned to a third solution containing the same quantity of ammonium sulfate and 92.5 grams of lanthanum nitrate ($La(NO_3)_3 \cdot 6H_2O$). The exchange was carried out over a period of about 1 hour at a temperature of 100° C. The zeolite was filtered and washed free of sulfate.

The zeolite was then calcined without predrying at a temperature of 1,300° F. for a period of 3 hours. After calcination, the product was cooled to room temperature. The product contained 2.71 percent $Na_2O$ (dry basis) and 2.12 percent lanthanum oxide.

The zeolite was exchanged 3 times with 10 percent ammonium sulfate solution, carried out at 100° C. for a period of 15 minutes. The product was washed and contained less than 0.2 percent $Na_2O$, and was thermally stable at 1,650° F.

The zeolite was partially converted to the aluminum form by exchange of the ammonium form of the zeolite with an aluminum chloride solution. This was done using 25 grams of product that had been exchanged after calcination. The exchange was carried out by contacting the 25-gram (dry basis) sample with a solution containing 11.1 grams of aluminum chloride ($AlCl_3 \cdot 6H_2O$) in 500 ml. of water. The exchange was carried out for a period of 1 hour at 100° C. The product was washed and dried. Analysis showed the product to have the following composition:

$(0.26\ Al_{2/3}O + Re_{2/3}O): Al_2O_3: 5.36\ SiO_2$.

This analysis indicates that 26 percent and 6 percent of the exchange capacity of the zeolite had been satisfied by aluminum ions and rare earth ions, respectively. The product was stable on heating to 1,700° F.

The product was evaluated for catalytic activity by comparison with the same product that had not been aluminum exchanged. This was accomplished by designating a sample of the zeolite that had been given the ammonium sulfate exchanges after washing as sample (a) and the product that was partially converted to the aluminum form as sample (b). The samples were prepared for catalytic evaluation by mixing 10 percent of the zeolite with 90 percent of a commercially available semisynthetic silica-alumina cracking catalyst containing about 60 percent amorphous silica-alumina and 40 percent clay. The resulting catalysts were pretreated by steaming at 1,350° F. for a period of 16 hours in a 100 percent steam atmosphere. The catalytic evaluations were run at 900° F. at a weight hourly space velocity of 16. The results are shown in Table B below:

TABLE B

| | Sample A | Sample B |
|---|---|---|
| Conversion V % feed | 46.8% | 70.2% |
| $C_5$+ Gasoline V % feed | 38.6% | 59.2% |
| $H_2$+ V % feed | 0.45% | 0.030% |

It is apparent from these data that the aluminum exchanged zeolite has exceptional properties, both as to the amount of conversion and the selectivity. More than 70 volume percent of the hydrocarbon feedstock was converted. The product had a $C_5$+ gasoline yield of greater than 59 percent. The conversion to hydrogen and low-boiling hydrocarbon was lower than for the catalyst of the prior art.

What is claimed is:

1. A process for preparing an aluminum form zeolite crystalline aluminosilicate having the empirical formula: $(0.1\ \text{to}\ 0.7\ Al_{2/3}O + \text{to}\ 0.6\ RE_{2/3}O): Al_2O_3\ 3.2-7\ SiO_2: 0-9\ H_2O$ characterized by a resistance to thermal degradation at temperatures as high as 1,700° F., and a surface area in excess of 800 square meters per gram, which comprises the steps of:

a. preparing a faujasite-type zeolite having a silica to alumina ratio of about 3.2 to 7.0,
   b. reducing the $Na_2O$ content of the zeolite to about 1.5 to 4.0 weight percent by ion exchange with an ammonium salt solution,
   c. ion exchanging the zeolite with a rare earth salt solution in a concentration sufficient to impart a rare earth content of about 0.3 to 10 percent by weight of the zeolite,
   d. drying and calcining the exchanged zeolite at a temperature of 700 to 1,600° F. for about 0.1 to 3 hours,
   e. exchanging to decrease the sodium oxide content of the zeolite to below 1 weight percent with an aluminum salt solution or a mixed ammonium and aluminum salt solution, and
   f. washing, drying, and recovering the zeolite product.

2. The process according to claim 1 wherein the rare earth ions are introduced into the zeolite by exchange with a mixed rare earth salt solution.

3. The process according to claim 1 wherein the ammonium salt solution contains a salt selected from the group consisting of ammonium sulfate, ammonium chloride, tetraethyl ammonium chloride, and tetraethyl ammonium sulfate.

4. The process according to claim 1 wherein the exchange with ammonium salt solution is carried out at a temperature of about 25° to 115° C. for a period of about 0.5 to 25 hours.

5. The process according to claim 1 wherein the aluminum exchange is carried out with a mixed aluminum-ammonium salt solution.

6. A process for preparing an aluminum-form zeolitic crystalline aluminosilicate having the empirical formula: $(0.1$ to $0.7$ $Al_{2/3}O+$ to $0.6$ $RE_{2/3}O)$: $Al_2O_3$: $3.2-7$ $SiO_2$: $0-9$ $H_2O$ characterized by resistance to thermal degradation at temperatures as high as $1,700°$ F., a surface area in excess of 800 square meters per gram and a rare earth content of 0.3 to 10 percent by weight which comprises:
   a. preparing a faujasite having a silica to alumina ratio of 3.2 to 7.0,
   b. reducing the $Na_2O$ content of the zeolite to about 3 weight percent by ion exchange with an ammonium sulfate solution,
   c. ion exchanging the zeolite with a rare earth salt solution to impart a rare earth content of 0.3 to 10 percent by weight to the zeolite,
   d. drying and calcining the zeolite at a temperature of about $700°$ to $1,600°$ F. for about 0.1 to 3 hours,
   e. exchanging with an aluminum salt solution to decrease to sodium oxide content below about 1 weight percent and
   f. washing, drying, and recovering the zeolite product.

7. As a composition of matter, an aluminum-form faujasite-type zeolitic crystalline aluminosilicate having the empirical formula: $(0.01$ to $0.7$ $Al_{2/3}O+$ to $0.6$ $RE_{2/3}O)$: $3.2-7$ $SiO_2$: $0-9$ $H_2O$ characterized by:
   a. stability to thermal degradation to a temperature of $1,700°$ F.,
   c. a surface area in excess of 800 square meters per gram,
   e. an $Na_2O$ content of less than 1 weight percent, and
   f. an ability to crack hydrocarbons selectively to a $C_5+$ gasoline fraction.

8. The composition according to claim 7 wherein said zeolite is suspended in and dispersed throughout a suitable inorganic matrix.